United States Patent Office 3,422,883
Patented Jan. 21, 1969

3,422,883
COOLING TOWERS
John Harold Daltry, Rugby, England, assignor to The English Electric Company Limited, London, England, a British company
Filed Aug. 17, 1966, Ser. No. 573,113
Claims priority, application Great Britain, Aug. 17, 1965, 35,314/65
U.S. Cl. 165—47                                    4 Claims
Int. Cl. E04b *1/12, 5/55;* F24h *3/00*

ABSTRACT OF THE DISCLOSURE

A cooling tower for a steam turbine installation having a central vertical column, a heat exchanger means including a plurality of coolers, a ring beam supported above the ground at the base of the tower which has a plurality of guides equi-spaced around its periphery, a plurality of main suspension cables radiating from the top of said column to anchorages arranged in a circle around the tower base, each said cable passing over a said guide, and cladding fixed to the cables and extending around the periphery of the tower between a bottom level above the ground and a top level below the top of the column to provide the wall of the tower.

---

This invention relates to cooling towers.

According to the invention, a cooling tower includes a central column, a plurality of main suspension cables radiating from a top level at or near the top of said column to anchorages arranged in a circle around the base of the cooling tower, and cladding fixed on said suspension cables and extending around the periphery of the tower from a bottom level above the ground to an intermediate level substantially below said top level.

Preferably, the cooling tower includes a ring beam supported at the base of the tower above the ground, each said suspension cable being at least partly supported on the ring beam.

According to one aspect of the invention, the suspension cables are arranged to pass through guide means on the ring beam, said anchorages being fixed to the ground.

The ring beam is preferably supported on the ground through a rigid support structure such as to allow air to flow through the support structure into the tower.

According to another aspect of the invention, in such a case said anchorages are on the ring beam.

Where the cooling tower is arranged to cool condensate from a condenser associated with a steam turbine supplied with steam from a boiler, said central column is an exhaust stack of said boiler.

According to a further feature of the invention, the cooling tower is a dry cooling tower having coolers, for indirect heat exchange of said condensate by air flow below said cladding into the tower, arranged around the base of the tower.

Preferably, in such a case at least part of the power plant comprising said boiler, turbine and condenser is arranged within the cooling tower.

Figure 1:
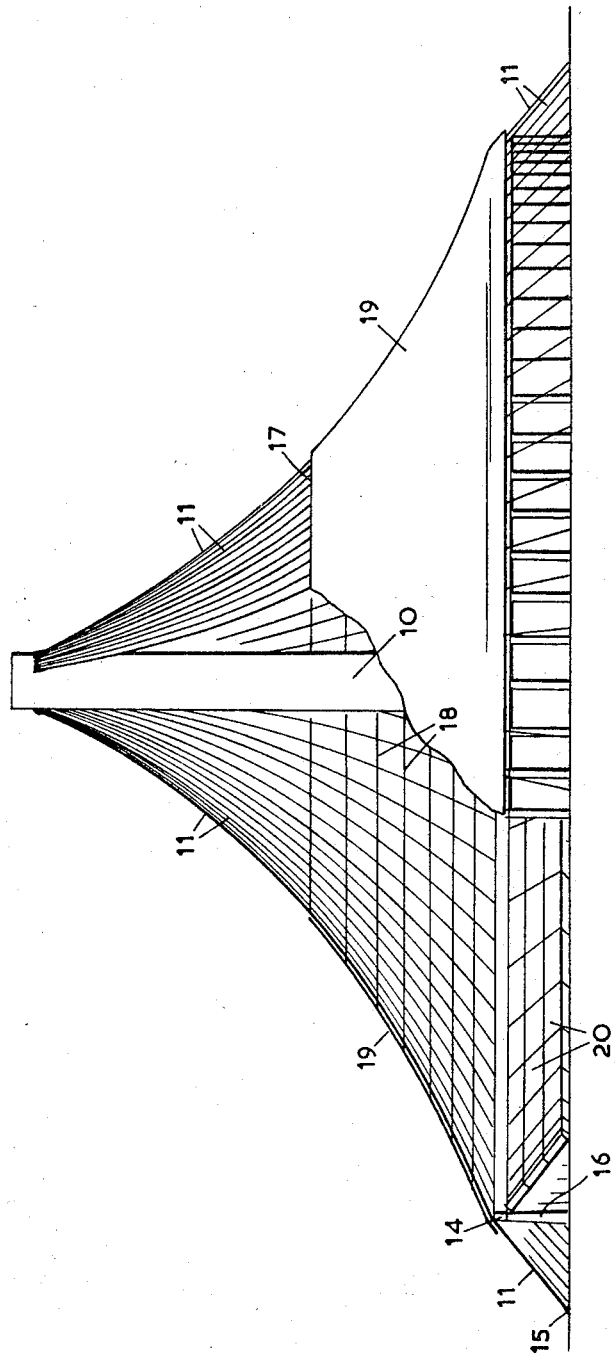
Figure 2:
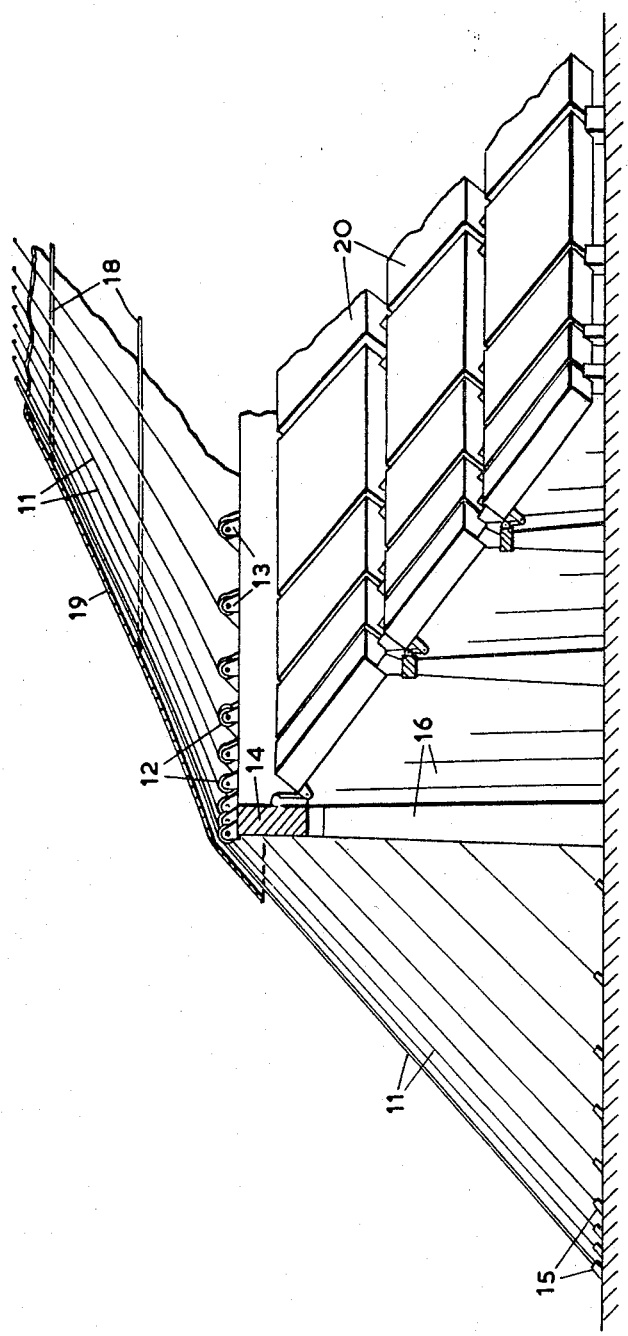

Cooling towers in a preferred form according to the invention will now be described by way of example and with reference to the accompanying drawings, of which:

FIG. 1 is a much-simplified half-sectional elevation through one cooling tower according to the invention and FIG. 2 is an enlargement of part of FIG. 1.

The cooling tower comprises a central column 10 having anchored to it, at a level near its top, one end of each of a large number of equally-spaced radially-extending main suspension cables 11. The cables 11 pass over the pulleys 12 of sheaves 13, which are arranged on a circular main ring beam 14 coaxial with the column 10, to terminate at anchorages 15 on the ground.

The ring beam 14, which may be of prestressed or reinforced concrete, precast or formed in situ, or which may alternatively be (for example) of steel, is supported on a suitable support structure. In this example this structure comprise concrete legs 16, but it may take any suitable form and may for example be of steel.

From the level of the ring beam 14 to a level indicated at 17 in FIG. 1, a number of circumferential purlin cables 18 are stretched around the main cables 11, to which they may be clamped by means not shown. A shell 19 comprising galvanised steel sheet cladding is supported on the purlin cables 18, and fixed to them by means not shown. The cladding may alternatively be of any other suitable material, for example plastics sheeting, aluminum, asbestos, timber or shell concrete, the method of fixing the cladding being determined accordingly. In some cases some or all of the purlin cables 18 may be omitted if the shell 19 is of sufficient strength and rigidity to be supportable only on the main cables 11. In the same conditions it may also be possible sometimes to omit the ring beam 14.

In an alternative arrangement, the main cables 11 terminate at the ring beam 14, the support structure for the ring beam then being made capable of transmitting to the ground the resulting forces on the ring beam.

It will be understood that if the main cables are anchored to the ground the support structure 16 may be omitted altogether, provided the main cables 11 are capable of providing enough stability.

Cooling towers according to the invention may be of the wet or dry kind, a wet cooling tower being one in which water to be cooled is brought into direct contact with air by spraying the water inside the tower, and a dry cooling tower being one in which the water is cooled by indirect heat exchange with air flowing through a number of coolers arranged around the base of the tower. The example shown in the drawings is a dry cooling tower with heat exchange means comprising a plurality of coolers 20 extending at an angle to the vertical from the ring beam 14 to the ground inside the tower, so that air is induced by convection to flow in through the space below the ring beam between the legs 16, through the coolers 20 and out through the top of the shell 19 at level 17.

Other arrangements of coolers are also possible, for example they may be upright and radial, or arranged in a zig-zag formation as seen in plan. The system of supporting coolers arranged as shown in FIG. 2 may for example be that described in our co-pending application, Ser. No. 660,818, filed Aug. 15, 1967.

In addition, radial walls to reduce wind effects may be provided at suitable intervals (say at every third main cable), these walls each substantially filling the area seen in elevation between the adjacent coolers, the ring beam 14 and the part of the corresponding main cable 11 below its pulley 12. Such walls are described more fully in our co-pending application Ser. No. 660,818, filed Aug. 15, 1967.

In the case of a dry cooling tower according to the invention, the column 10 may in fact be the chimney of a steam generator of a power station incorporating a condensing turbo-generator set or sets, supplied with steam from the steam generator, the cooling tower forming part of the water cooling system for the turbine condenser or condensers. The power station in such a case may be situated entirely, or almost entirely, within the cooling tower, as described in our British Patent No. 1,027,301. Nothing in the present specification is to be taken as claiming anything claimed in the said patent.

I claim:

1. In a cooling tower with a central column adapted for a steam turbine apparatus comprising heat exchanger means, a ring beam supported in a horizontal plane above the ground at the base of the tower, said ring beam being coaxial with said column, a plurality of guide means equispaced around said ring beam, a plurality of main suspension cables radiating from the top of said column to anchorages arranged in a circle around the tower base, each said cable passing over said guide means, and cladding fixed on said suspension cables and extending around the periphery of the tower between a bottom level above the ground and a top level below the top of the column, said cladding thus providing the wall for said tower.

2. A cooling tower according to claim 1 wherein said steam turbine apparatus is adapted to receive steam from a boiler and said central column is an exhaust stack for the boiler.

3. A cooling tower according to claim 1 wherein the steam turbine apparatus comprises a boiler, and condenser arranged within the cooling tower.

4. A cooling tower according to claim 1 wherein said heat exchanger means comprises a plurality of coolers which extend inwardly at an angle from the inner peripheral extent of said ring beam to the ground wherein hot water is fed to the coolers for indirect heat exchange with the air flowing through said coolers and said cooling tower.

References Cited

UNITED STATES PATENTS

| | | | |
|---|---|---|---|
| 1,773,656 | 8/1930 | Wasilkowski | 52—63 |
| 1,990,838 | 2/1935 | Nemec | 52—83 |
| 3,153,302 | 10/1964 | Wheeler | 52—82 |
| 3,322,409 | 5/1967 | Reed. | |

ROBERT A. O'LEARY, *Primary Examiner.*

T. W. STREULE, *Assistant Examiner.*

U.S. Cl. X.R.

261—140; 52—63, 83